US010815055B2

(12) United States Patent
Overfield et al.

(10) Patent No.: US 10,815,055 B2
(45) Date of Patent: Oct. 27, 2020

(54) LOAD TRANSFER MECHANISM

(71) Applicants: Paul David Overfield, Drakes Broughton (GB); Simon Mark Brown, London Lane Tardebigge (GB)

(72) Inventors: Paul David Overfield, Drakes Broughton (GB); Simon Mark Brown, London Lane Tardebigge (GB)

(73) Assignee: Translift Spacemate Limited, Worcestershire (GB)

( * ) Notice: Subject to any disclaimer, the term of this patent is extended or adjusted under 35 U.S.C. 154(b) by 179 days.

(21) Appl. No.: 15/557,550

(22) PCT Filed: Mar. 14, 2016

(86) PCT No.: PCT/GB2016/000050
§ 371 (c)(1),
(2) Date: Sep. 12, 2017

(87) PCT Pub. No.: WO2016/142641
PCT Pub. Date: Sep. 15, 2016

(65) Prior Publication Data
US 2018/0050868 A1    Feb. 22, 2018

(30) Foreign Application Priority Data

Mar. 12, 2015    (GB) .................................. 1504172.6

(51) Int. Cl.
*B66F 9/14*    (2006.01)
*B65G 1/04*    (2006.01)

(52) U.S. Cl.
CPC ............ *B65G 1/0435* (2013.01); *B66F 9/141* (2013.01)

(58) Field of Classification Search
CPC .............................. B65G 1/0435; B66F 9/141
See application file for complete search history.

(56) References Cited

U.S. PATENT DOCUMENTS 3,549,025 A     12/1970  Messner
4,058,270 A  *  11/1977  Simmons ................ B21C 47/18
                                                 242/420
(Continued)

FOREIGN PATENT DOCUMENTS

NL            133258           1/1972

OTHER PUBLICATIONS

International Search Report for PCT/GB2016/000050, Completed by the European Patent Office dated Jun. 9, 2016, 6 Pages.

*Primary Examiner* — Saul Rodriguez
*Assistant Examiner* — Willie Berry, Jr.
(74) *Attorney, Agent, or Firm* — Brooks Kushman P.C.

(57) ABSTRACT

A mechanism for transferring loads characterized by a frame adapted to be mounted on a lift mechanism of a lift truck, having a pair of telescopic rails mounted at one end to the frame. The telescopic rails extending parallel to one another, extendable laterally of the lift mechanism of the lift truck, between retracted and extended positions by an actuator that moves the telescopic rails. A carriage is mounted on the telescopic rails for movement there along when the telescopic rails are in their extended positions and the free ends of the telescopic rails are supported. The carriage having a secondary lift mechanism mounted thereon by which a load may be raised and lowered relative to the carriage.

14 Claims, 12 Drawing Sheets

(56) References Cited

U.S. PATENT DOCUMENTS

| | | | |
|---|---|---|---|
| 5,011,363 A * | 4/1991 | Conley, III | B66F 9/10 |
| | | | 180/315 |
| 6,179,541 B1 | 1/2001 | Rioux et al. | |
| 2004/0093713 A1* | 5/2004 | Laird | B60B 29/002 |
| | | | 29/468 |

* cited by examiner

LOAD TRANSFER MECHANISM

CROSS-REFERENCE TO RELATED APPLICATION

This application is the U.S. national phase of PCT Application No. PCT/GB2016/000050 filed on Mar. 14, 2016, which claims priority to GB Patent Application No. 1504172.6 filed on Mar. 12, 2015, the disclosures of which are incorporated in their entirety by reference herein.

TECHNICAL FIELD

The present invention relates to a load transfer mechanism and in particular a load transfer mechanism for use with lift trucks to transfer pallets to and from racking. The mechanism according to the present invention may form a separate attachment for use with a lift truck.

BACKGROUND

With conventional lift trucks, when transferring a load from the lift truck to a racking system, the lift truck must be capable of balancing the load, as it is transferred into the racking system. This is normally achieved by means of counter weights which are mounted on the lift truck, remote from the lift mechanism upon which the load is carried. Even with this type of lift truck, in order to maximise the load handling capacity, the load must be transferred to the racking system by approaching the racking system at 90 degrees. This requires wide aisles between the rows of racking, significantly reducing the density of storage possible.

SUMMARY

One solution to this problem is to use an articulated truck in which the lift mechanism is pivoted with respect to the main body of the truck, so that the lift mechanism may be manoeuvred so that it approaches the racking at 90 degrees, in a narrower aisle.

It is possible to achieve significantly higher stacking densities by reducing the aisle width to slightly greater than the width of the lift truck and transferring the load sideways onto the racking. In order to achieve this, it is necessary to move the load away laterally from the lift mast of the lift truck. However, as the load is moved laterally the moment applied to the lift truck causing it to tend to topple sideways will increase, thus reducing the load handling capability of the lift truck.

The mechanism according to the present invention increases the load handling performance of the lift truck.

According to one aspect of the present application, a mechanism for transferring loads comprises a frame adapted to be mounted on a lift mechanism of a lift truck, a pair of telescopic rails mounted at one end to the frame, the telescopic rails extending parallel to one another, the telescopic rails being extendable laterally of the lift mechanism of the lift truck, between refracted and extended positions, means to move the telescopic rails between the retracted and extended positions, a carriage mounted on the telescopic rails for movement there along when the telescopic rails are in their extended positions and the free ends of the telescopic rails are supported, the carriage having a secondary lift mechanism mounted thereon by which a load may be raised and lowered relative to the carriage.

With the mechanism described above a load may be mounted on the secondary lift mechanism and raised to an appropriate level for transfer to a racking system, by the lift mechanism of the lift truck. The telescopic rails may then be extended laterally into the racking system and lowered by the lift mechanism of the lift truck, so that they engage the racking system. The secondary lift mechanism is adjusted to raise the load above the level of the racking and the carriage is then moved laterally along the telescopic rails, to move the load into the racking system, the load being supported on the telescopic rails by the lift mechanism of the lift truck at one end and by the racking system at the other end, so that there is no moment applied to the lift truck causing it to topple sideways. Finally, the load is lowered onto the racking system by means of the secondary lift mechanism.

Loads may be removed from the racking system by first moving the telescopic rails into engagement with the racking as described above, moving the carriage with the secondary lift mechanism lowered, to engage the load; lifting the load clear of the racking system by means of the secondary lift mechanism; moving the carriage and load back along the telescopic rails to the lift mast of the lift truck; finally telescopic rails are moved out of engagement with the racking system and are retracted.

As during the lateral movement of the load the telescopic rails are supported at each end, no moment is applied to the lift truck causing it to topple sideways, the load handling capacity of the lift truck will be substantially improved.

The mechanism according to the present invention may be used with any suitable lift truck, for example support rail stackers, counterbalance trucks, reach trucks, articulated trucks, VNA turret trucks or stacker cranes. The mechanism may be used as the primary load bearing means of the lift truck or as an attachment that may replace the primary load bearing means or be mounted on the primary load bearing means.

The movement of the telescopic rails between the extended and retracted positions; movement of the carriage along the telescopic rails and raising and lowering of the secondary lift mechanism may be achieved by mechanical, hydraulic, pneumatic or electrical means or any combination thereof, which may be independent of or integrated with the power systems of the lift truck. Control means including actuators and sensors are provided for sequencing the various stages of operation and prevent movement of the carriage and load along the telescopic rails until the rails are fully supported by the racking system.

BRIEF DESCRIPTION OF THE DRAWINGS

The invention is now described, by way of example only, with reference to the accompanying drawings, in which:—

DETAILED DESCRIPTION

Figure 1:
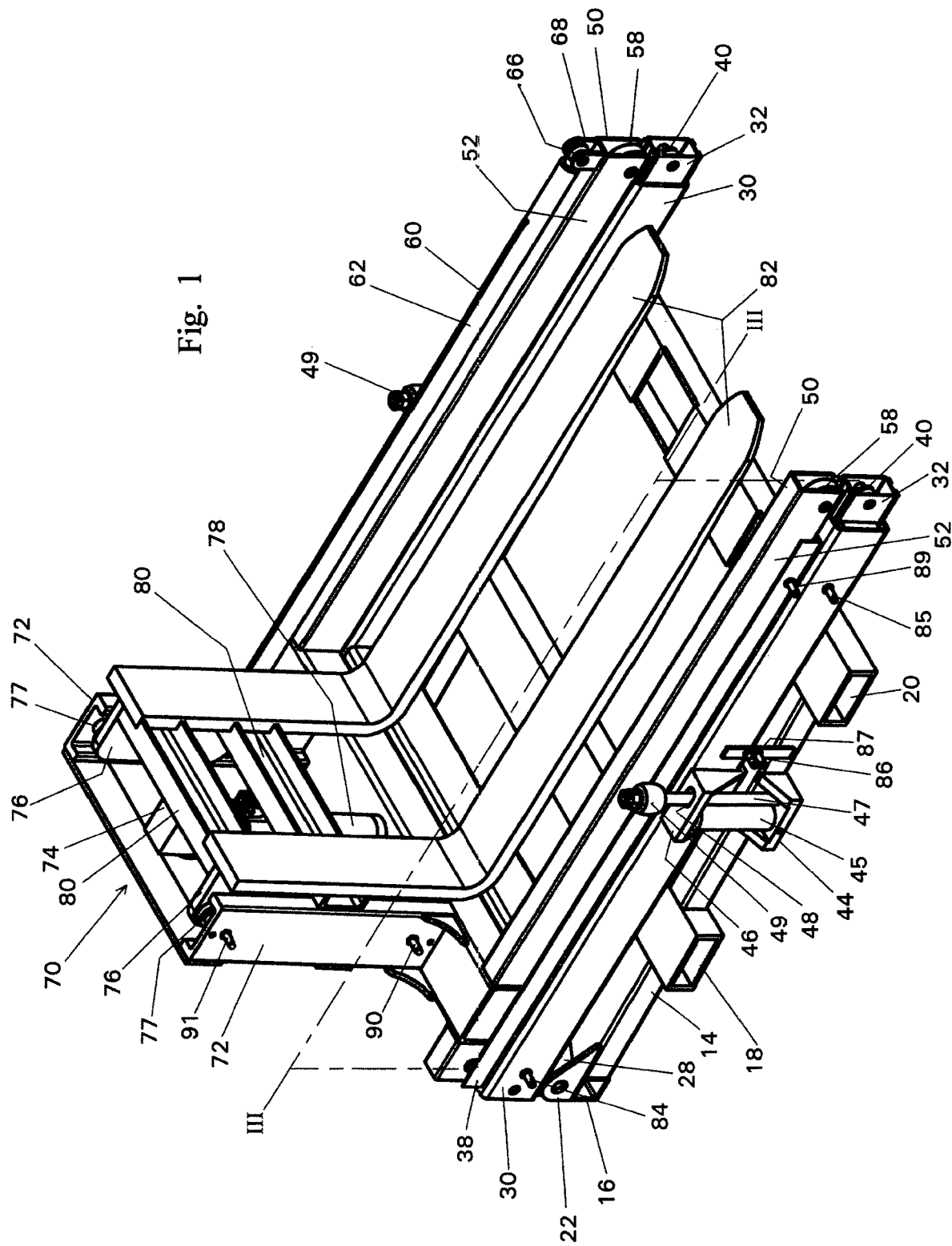
FIG. 1 is an isometric view from the front, side and above, of a load transfer mechanism for a fork lift truck in accordance with the present invention, in a retracted state.

In the following description, the orientation of the various components of the attachment are described with reference to the longitudinal axis of the lift truck in association with which the attachment is to be used. That is the axis from front to rear of the lift truck, when in the straight ahead position.

The accompanying drawings illustrate an attachment which is designed to be mounted on the forks of the main lift mechanism of a lift truck. The attachment described is designed for use with racking systems having front and rear parallel support beams which span between vertical uprights, the support beams being spaced horizontally so that pallets may be supported thereon adjacent their front and rear edges. The invention is furthermore described as used with two way pallets having top and bottom decking boards, secured laterally between parallel fore/aft extending stringers.

The attachment may however be used with other forms of racking system and with other forms of pallet.

As illustrated in the accompanying drawings the attachment 10 comprises a sub-frame 12, with a pair of parallel transversely extending side members 14. The side members 14 are connected by longitudinally extending cross members 16, 18, 20, cross members 16 and 20 being positions at opposite extremities of the side members 14 and cross member 18 being positioned intermediate of the cross members 16 and 20. The cross members 18 and 20 are of rectangular box section and are spaced apart, so that the forks of the main lift mechanism of the lift truck may engage in the tubular cross members 18, 20 to mount the attachment 10 to the lift truck.

A pair of hinge formations 22 are provided on the cross member 16, one at each end of the cross member 16. A pair of transversely extending telescopic rails 24 are attached by the hinges 22 to the cross member 16 so that they overlie the side members 14. The telescopic rails 24 are free to pivot about hinges 22 from a position in which the extend downwardly towards the frame 12 from the hinged ends to the free ends, to a position in which they are tilted upwardly away from the frame, from the hinged ends to the free ends.

The telescopic rails 24 each comprise an outer box section rail 30 with an inner box section rail 32, slidably located within the outer rail 30. The outer rails 30 are connected to hinge formations 22 of the frame 12 by hinge plates 28 which space the hinged ends of telescopic rails 24 from the side members 14 of frame 12. The outer rails 30 of the telescopic rails 24 are secured together, parallel to one another, adjacent the hinged ends, by cross members 33, 34.

A pair of spaced strips 35 of plastics bearing material, for example Nylon 66, are provided longitudinally along the top and bottom walls of the inner rails 32, one strip 35 adjacent each edge of the top and bottom wall, the strips 35 slidably engaging the interior surface of the top and bottom walls of the outer rails 30. Blocks 36 of plastics bearing material, for example nylon 66, are secured to the outer side walls of the inner rails 32, adjacent the ends of inner rails 32 which engage the hinged ends of outer rails 30, to slidably engage the inner surface of the outer side wall of the outer rail 30.

Flange formations 38 are provided on the upper surface of the outer rails 30 to provide a track for a carriage 50, to guide movement of the carriage 50 along the telescopic rails 24, when fully deployed.

Double acting hydraulic rams 40 are mounted within the inner and outer rails 30, 32, the cylinder 41 of the ram 40 being secured to the outer rail 30, at the hinged end thereof, and the piston 42 of the ram 40 being secured to the inner member 32 at the end thereof remote from the hinged end of the telescopic rail 24.

Brackets members 44 are secured to the outside of each side member 14 of the frame 12, intermediate of the cross members 18 and 20. A tilt ram 45 is mounted on each of the bracket members 44, the tilt rams 45 extending perpendicular to the side members 14 towards the telescopic rails 24. The tilt rams 45 are double acting rams, the piston of each ram 45 engaging/an abutment plate 46 secured to the outer wall the adjacent outer rail 30. The rams 45 act to pivot the telescopic rails upwardly from the downwardly tilted position to the upwardly tilted position. The telescopic rails are however free to tilt upwardly away from the rams 45. A tie bolt 47 is secured to each bracket member 44 and extends parallel to the tilt ram 45. The tie bolts 47 extend through apertures 48 in the abutments plates 46 and a stop 49, with a rubber buffer, is provided at the free end of each tie bolts 47, so that engagement of the stops 49 against the abutment plates 46 will limit upward movement of the telescopic rails 24 relative to the frame 12.

Figure 2:
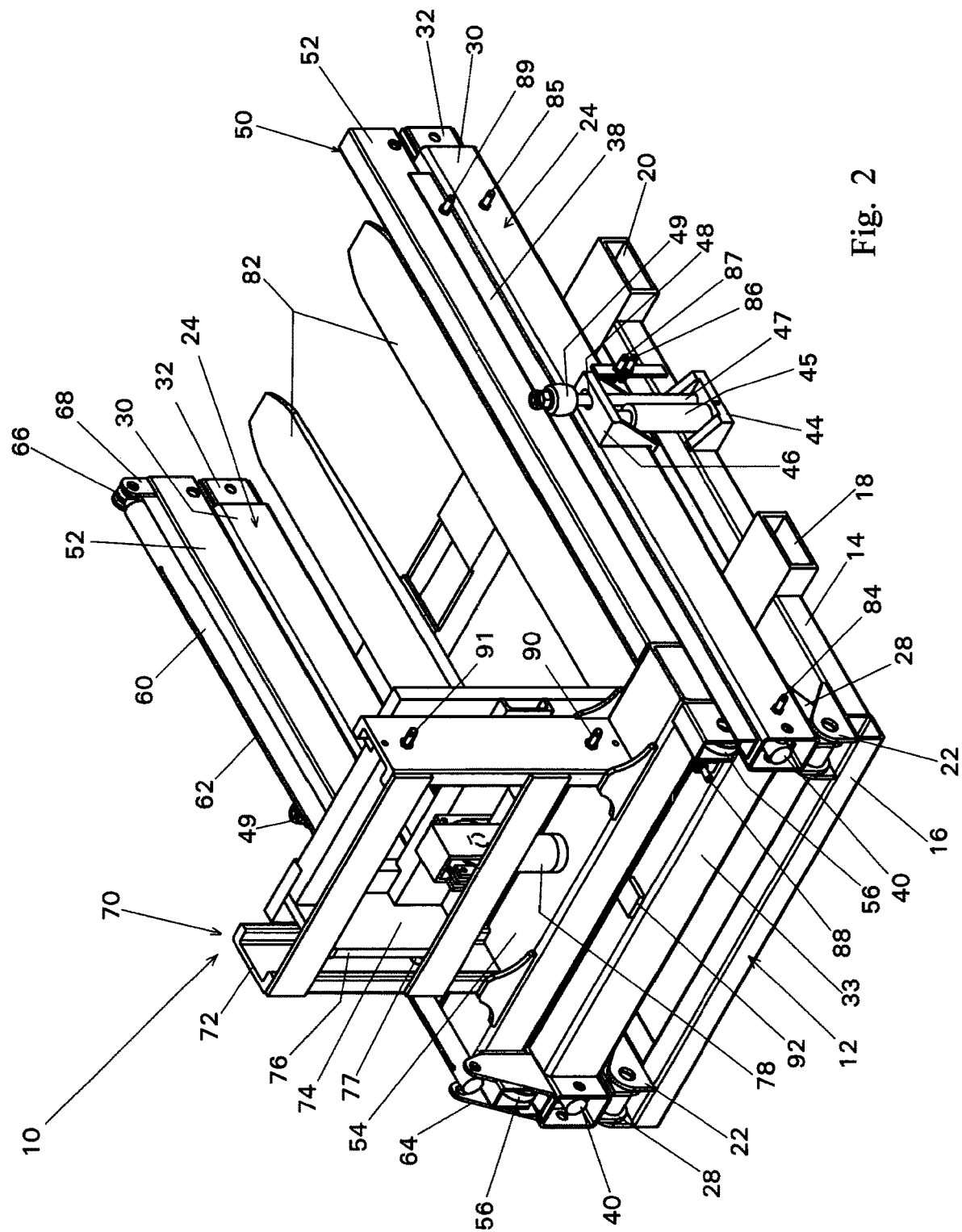
FIG. 2 is an isometric view from the rear, side and above, of the load transfer mechanism shown in FIG. 1.

The carriage 50 comprises a pair of rectangular box section chassis members 52 which extend parallel to and in overlying relationship to the telescopic rails 24. The chassis members 52 are interconnected at the ends adjacent the hinged ends of the telescopic rails 24 by a box section cross member 54. The bottom walls of the box section chassis members 52, adjacent the ends of the chassis members, are cut away to form downwardly opening channel sections at the ends of the chassis members 52. Wheels 56, 58 are mounted for rotation within the channel sections at each end of the chassis members 52, wheels 56 for rotation about a common axis adjacent the end of the chassis members 52 at the end thereof adjacent the hinged end of the telescopic rails 24 and wheels 58 for rotation about a common axis of rotation adjacent the end of the chassis members 52 remote from the hinged end of the telescopic rails 24. The wheels 56 and 58 are positioned on the chassis members 52 so that they extend below the lower open edge of the channel section of the chassis members 52 and engage the upper surface of the outer rails 30, of the telescopic rails 24, between the flange formations 38. The wheels 56 and 58 are spaced apart such that when the attachment is in the retracted state as illustrated in FIGS. 1 and 2, wheels 56 will engage the upper surface of the outer rail 30 adjacent the hinged end of the telescopic rail 24, while the wheels 58 will engage end portions of the inner rail 32, which extend beyond the ends on the outer rails 30 when the telescopic rail 24 is fully retracted. The wheels 58 engage the upper surface of the inner rail 32, between the bearing strips 35. The wheels 56 and 58 are mounted on the chassis members 52 at different heights, to accommodate the difference in height of the upper surfaces of the inner and outer rails 30, 32.

A double acting hydraulic ram 60 is located above one of the chassis members 52. The cylinders 62 of the ram 60 is secured to the outer rail 30 adjacent the hinged end of telescopic rails 24 by means of a bracket 64 and the piston 66 of the ram 60 is secured to a bracket 68 on the end chassis members 52 of the carriage 50 remote from the hinged end of the telescopic rail 24.

A secondary lift mechanism 70 is secured to the cross member 54 of the carriage 50, centrally thereof. The secondary lift mechanism 70 comprises a pair of upstanding channel section beams 72, the channel section beams 72 opening towards one another. A carriage 74 is mounted between the channel section beams 72, the carriage 74 having a pair of side plates 76 with rollers bearings for engagement in opposed channels of the beams 72, whereby the carriage 74 is guided for vertical movement up and down the beams 72. A double acting hydraulic ram 78 acts between plate 54 and the carriage 74 to move the carriage up and down the beams 72. A pair of cross members 80 are provided on the carriage 74 by which a pair of forks 82 may be secured to the carriage 74 in known manner. The forks 82 are mounted on the carriage 74 such that; when the carriage 74 is in its lowermost position, the forks 82 do not extend below the lower surfaces of the inner rails 32 of telescopic rails 24, when the telescopic rails 24 are disposed horizontally; and when the carriage 74 is in its uppermost position, the forks will be above the level of the chassis members 52.

Limit switches 84, 85 are provided to detect the extremes of movement of the telescopic rails 24; limit switches 86, 87 are provided to detect the extremes of movement of the tilt rams 45; limit switches 88, 89 are provided to detect the extremes of movement of the carriage 50; and limit switches are provided to detect the extremes of movement of the secondary lift mechanism 70. A two axis level sensor 92 is provided for sensing the plane of the telescopic rails 24. This level sensor will ensure that the extended telescopic rails 24 are disposed in the plane of the support surfaces of the front and rear beams 142, 144 of the racking system so that the rails 24 engage both the front and rear beams 142, 144. The level sensor 92 will nominally sense when the telescopic rails 24 are disposed in a horizontal plane, but may be calibrated to accommodate tolerance variations in the levels of the beams 142, 144.

The limit switches 84, 85, 86, 87, 88, 89 and level sensor 92 all provide inputs to a programmable logic controller (PLC) 93, which controls a hydraulic circuit 100. Visual indication means 94 is also connected to the PLC 93 to indicate the position in the control cycle of the PLC 93. The attachment is provided with a battery power source to power the control system. Switch means 95 is also provided on the frame 12, on the underside thereof, to indicate engagement of the frame 12 with the floor or some other solid support platform from or to which a pallet is to be transferred.

Figure 13:
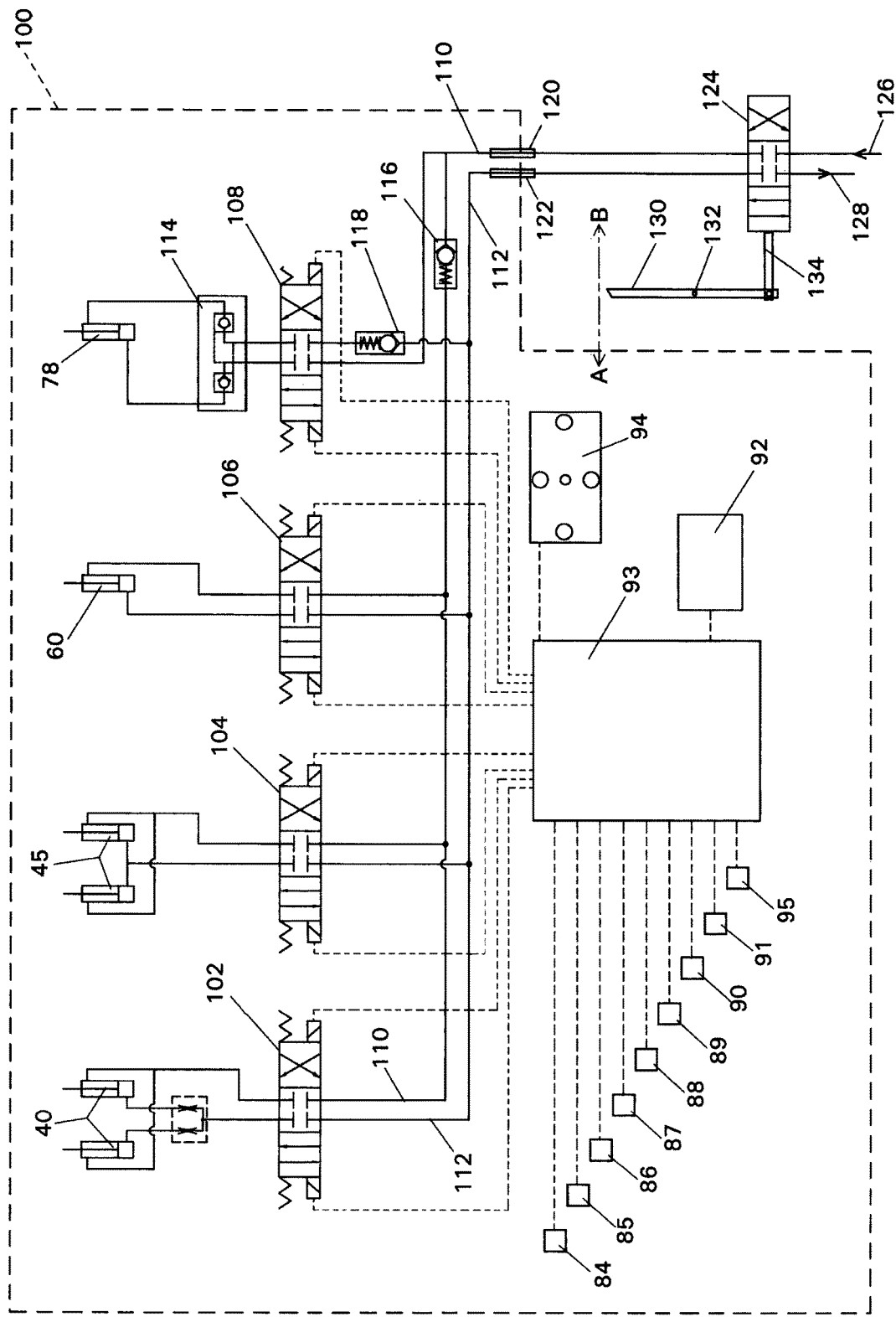
FIG. 13 shows a hydraulic circuit for the mechanism illustrated in FIG. 1.

As illustrated in FIG. 13, the hydraulic circuit 100 comprises a first hydraulic solenoid valve 102 which selectively connects each side the rail cylinders 40 to hydraulic line 110 or 112; a second hydraulic solenoid valve 104 which selectively connects each side the tilt cylinders 45 to hydraulic line 110 or 112; a third hydraulic solenoid valve 106 which selectively connects each side the cartridge cylinder 60 to hydraulic line 110 or 112; and a fourth hydraulic solenoid valve 108 which selectively connects each side the rail cylinders 40 to hydraulic line 110 or 112. The solenoid valve 108 is connected to each side of the lift cylinders 78 via a pilot operated check valve 114, which will ensure that the lift cylinders are hydraulically locked, when no hydraulic pressure is applied.

A non-return valve 116 is provided in line 110 to prevent return flow from solenoid valves 102, 104 and 106, while a non-return valve 118 between solenoid valve 108 and line 112 prevents return flow from solenoid valve 108.

On conventional hydraulically driven fork lift trucks, there are normally at least three lever operated spool valves, one to control fore/aft tilting of the lift mast, one to control raising and lowering of the forks and an auxiliary power take-off, for example a side shift take-off, by which the forks may be shifted from side to side.

The lines 110 and 112 of the hydraulic circuit of the attachment described above, are provided with connectors 120, 122 by which they may be connected to the lever operated spool valve 124 which controls the auxiliary hydraulic power take-off, for example a side shift take-off, from the hydraulic system of the fork lift truck.

The lever 130 is pivoted about a fulcrum 132 and is connected to a control rod 134 which controls movement of the spool. The lever operated spool valve 124 selectively connects line 110 and 112 to a source 126 of hydraulic fluid under pressure, or to drain 128. With the lever 130 in the central neutral position, the lines 110 and 112 will be isolated from the hydraulic pressure source 126 and from the drain 128. When the lever is pushed in direction A, the spool is moved to the right, connecting line 110 to the hydraulic pressure source 126 and line 112 to drain 128, thus connecting solenoid valves 102, 104 and 106 to the power source via line 110 and to drain via line 112. While in this state solenoid valve 108 is connected to the hydraulic pressure source 126 by line 110, it is isolated from the drain 128 by the non-return valve 118. When the lever 130 is pulled in the direction B, the spool is moved to connect line 112 to the hydraulic pressure source 126 and line 110 to drain 128. In this state solenoid valve 108 is connected to the hydraulic pressure source 126 via line 112 and non-return valve 118 and to drain 128 via line 110, while solenoids 102, 104 and 106 are connected to the hydraulic pressure source source 126 via line 112, they are isolated from the drain 128 by non-return valve 116. Solenoid valves 102, 104 and 106 will consequently only operate to actuate cylinders 40, 45 and 60 respectively, when the lever 130 is pushed in the direction A, and solenoid valve 108 will only operate cylinder 78, when the lever 130 is pulled in direction B.

The attachment 10 may be mounted on the fork lift truck from the ground, by engaging the forks of the truck in the tubular cross members 18, 20 of the sub-frame 12. When mounted on the forks of the fork lift truck, the telescopic rails 24 will be extendable to one side of the longitudinal axis of the fork lift truck, so that loads may be transferred to and from a racking system on that side of the fork lift truck, while the longitudinal axis of the fork lift truck is parallel to the racking system. In this manner the aisle between rows of racking need only be wide enough to accommodate the width of the lift truck plus an operational clearance of about 150 mm per side. The attachment 10 may be used to transfer loads to racking system on the other side of the aisle by approaching the aisle from the other direction. Alternatively, the attachment 10 may be picked up by the lift truck from the other side, so that the telescopic rails 24 are extendable to the other side of the lift truck.

At start up, the solenoid valves 102, 104, 106 and 108 are all de-energised with rams 40, 45, 60 and 78 in the fully retracted positions.

The PLC 93 is programmed to control solenoid valves 102, 104 and 106 through a first sequence of stages and solenoid valve 108 through a second sequence of stages.

The visual display unit 94 indicates the position in the first and second sequence at any time. The visual display unit 94 may be in the form of a light box which has four lights which indicates whether the solenoids 102, 104 and 106 are in a position to extend or retract the rams 40, 45 and 60 respectively, or solenoid 108 is in a position to raise or lower ram 78. Alternatively, other display means, for example a LED display, may be used to provide detailed information about the operating sequences.

The first sequence comprises the following stages:—

"Tilt down":—when solenoid valve 104 is energised to connect the piston ends of rams 45 to line 110 and the closed ends of rams 45 to line 112. With lever 130 pushed in the direction A, the piston ends of rams 45 are connected to the hydraulic pressure source 126 and the closed ends are connected to drain 128, causing the rams 45 to retract and the rails 24 to tilt down. When the rams 45 are fully retracted, a signal from limit switch 87 will cause the PLC 93 to move to the next stage of the first sequence.

"Rail out":—when solenoid valve 102 is energised to connect the closed ends of rams 40 to line 110 and the piston ends of rams 40 to drain. In this position, when lever 130 is pushed in the direction of arrow A, the closed ends of rams 40 are connected to the hydraulic pressure source 126 and the piston ends connected to drain 128, the rams will thereby extend, extending the telescopic rails 24. When the rails 24 are fully extended, a signal from limit switch 85 will cause the PLC 93 to be ready to move to the next stage in the first sequence. The next stage in the first sequence will not however commence until the level sensor indicates that the extended rails 24 are disposed in the plane of the beams 142, 144 of the racking system, and engage both the front and rear beam 142, 144 of the racking system or switch means 95 indicates that the extended rails 24 engage the floor or other support platform.

"Carriage out":—when solenoid valve 106 is energised to connect the closed end of ram 60 to line 110 and the piston end of ram 60 to line 112. With lever 130 pushed in direction A, the closed end of ram 60 is connected to the hydraulic power source 126 and the piston end is connected to drain 128, causing ram 60 extend the carriage 50 move out along the rails 24. When the carriage reaches the full extent of its movement, a signal from limit switch 89 will cause the PLC 93 to move to the next stage in the first sequence.

"Carriage in":—when solenoid valve 106 is energised to connect the piston end of ram 60 to line 110 and the closed end of ram 60 to line 112. With lever 130 pushed in the direction A, the piston end of ram 60 is connected to the hydraulic pressure source 126 and the closed end is connected to drain 128, causing the ram 60 to retract and the carriage 50 to move back along the rails 24. When the carriage 50 is at the full extent of its movement back to the hinged end of rails 24, a signal from limit switch 88 will cause the PLC 93 to move to the next stage in the first sequence.

"Tilt up":—when solenoid valve 104 is energised to connect the closed ends of rams 45 to line 110 and the piston ends of rams 45 to line 112. With lever 130 pushed in the direction A, the closed ends of rams 45 are connected to the hydraulic pressure source 126 and the piston ends are connected to drain 128, causing the rams 45 to extend and the rails 24 to tilt upwardly. When the rams 45 are fully extended against the stop 49, a signal from limit switch 86 will cause the PLC 93 to move to the next stage in the first sequence. In this position any load mounted on the forks 82 of the attachment (10) will be tilted backwards and may be moved around safely on the lift truck. Engagement of the stops 49 will also prevent rebound of the telescopic rails 24.

"Rail in":—when solenoid valve 102 is energised to connect the piston ends of rams 40 to line 110 and the closed ends of rams 40 to drain. In this position, when lever 130 is pushed in the direction of arrow A, the piston ends of rams 40 are connected to the hydraulic pressure source 126 and the closed ends connected to drain 128, the rams will thereby retract, retracting the telescopic rails 24. When the rails 24 are fully retracted, a signal from limit switch 84 will cause the PLC 93 to move back to the starting point of the first sequence.

The second sequence comprises the following stages:—

"Lift up":—when solenoid valve 108 is energised to connect the closed end of ram 78 to line 112 and the piston end of ram 78 to line 110. With lever 130 pulled in direction B, the closed end of ram 78 is thereby connected to the hydraulic pressure source 126 and the piston end is connected to drain 128, causing the ram 78 to extend raising the forks 82 of the secondary lift mechanism 70. When the forks 82 reach the full extent of their upward movement, a signal is produced by the limit switch causing the PLC 93 to be ready to move to the next stage in the second sequence.

"Lift down":—when solenoid valve 108 is energised to connect the piston end of ram 78 to line 112 and the closed end of ram 78 to line 110. With lever 130 pulled in direction B, the piston end of ram 78 is thereby connected to the hydraulic pressure source 126 and the closed end is connected to drain 128, causing the ram 78 to retract lowering the forks 82 of the secondary lift mechanism 70. When the forks 82 reach the full extent of their downward movement, a signal is produced by the limit switch causing the PLC 93 to be ready to move back to the first stage in the second sequence.

To lift a loaded pallet 150 from the floor, the fork lift truck with attachment 10 mounted on the forks, is maneuvered so that the telescopic rails 24 are aligned one on either side of the pallet 150, with the rails 24 perpendicular to the front face of the pallet 150. The forks of the lift truck are then lowered by pushing the lift control spool valve lever of the lift truck forwards, until the frame 12 of the attachment 10 comes into contact with the ground and switch means 95 sends a signal to the PLC 93.

The forks 82 of the attachment 10 are then lowered to their lowermost extent, by pulling lever 130 of the side shift spool valve in direction B and waiting for the PLC 93 to complete the Lift down stage of the second sequence.

Lever 130 is then pushed in direction A, so that the PLC 93 executes the "Tilt down" stage of the first sequence, until switch means 87 indicates the limit of downward movement of rams 45.

The PLC will then execute the "Rail out" stage of the first sequence, until when the rails 24 are fully extended the ends of the downwardly tilted rails 24 will engage the floor.

The signal from switch means 95, overrides the requirement for a signal from the level sensor 92, so that with lever 130 stilled pushed forwards, the PLC 93 then executes the "Carriage out" stage of the first sequence, until the carriage 50 reaches the limit of its movement away from the hinged ends of rails 24 and the upright portions of forks 82 abut against the front face of the pallet 150.

Lever 130 is then pulled back in direction B and the PLC 93 executes the "Lift up" stage of the second sequence.

When the forks 82 are at the limit of their upward movement lever 130 is pushed forward in direction A and the PLC 93 executes the "Carriage in" stage of the first sequence, until limit switch indicates that the carriage is at the extreme of its movement towards the hinge end of rails 24.

With lever still pushed forward, the PLC 93 executes the "Tilt up" stage of the first sequence and when limit switch 86 indicates that the rams 45 are at the limit of their extension when the rails 24 will be clear of the floor, the PLC 93 will then execute the "Rail in" stage of the first sequence. The lever 130 is then returned to its central neutral position in which solenoids 102, 104, 106 and 108 are isolated from the hydraulic power source 126 and drain 128.

When the rails 24 are fully retracted, the load 150 is supported on the forks 82 of the mechanism 10, which are tilted upwardly against the stops 49 so that the load is securely held against the back of the forks 82 and may be safely moved around on the lift truck.

Figure 3:
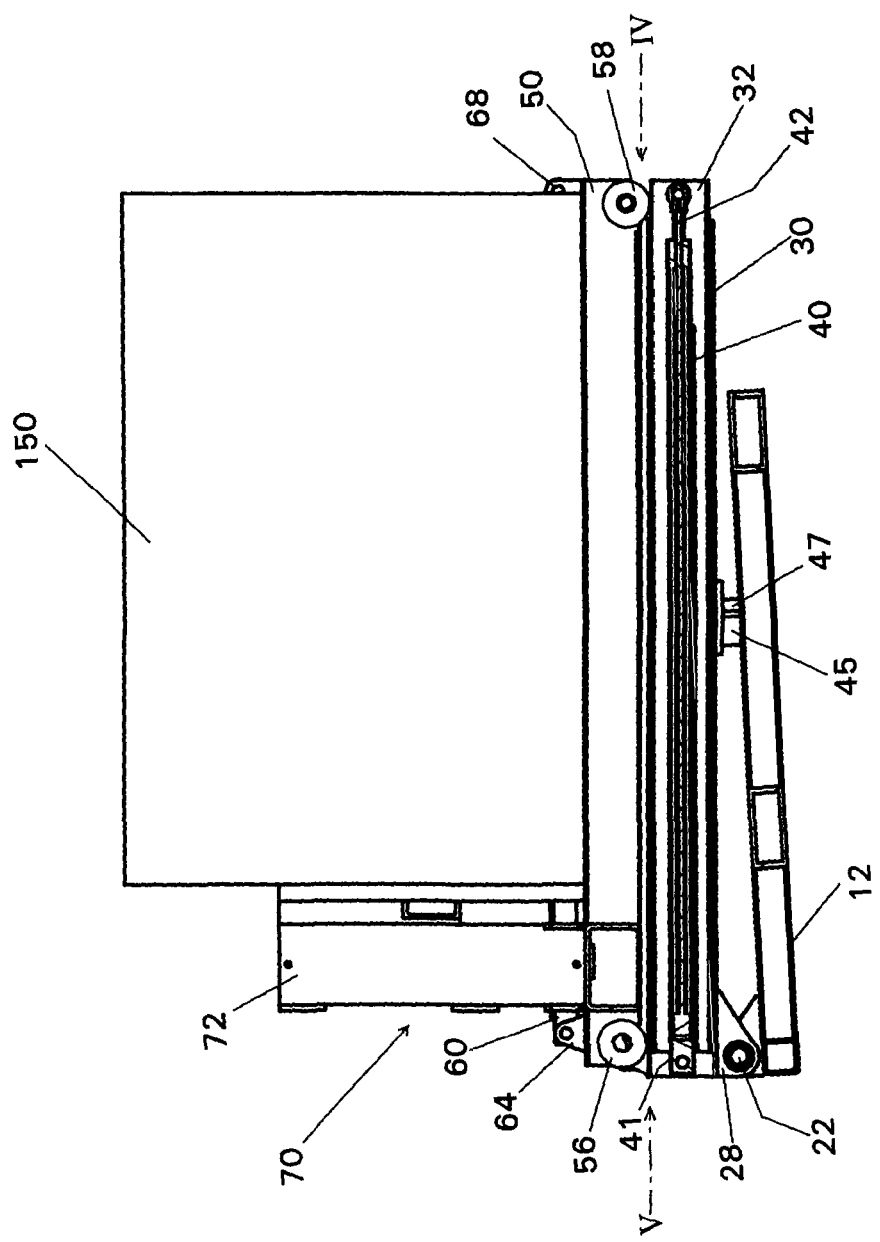
FIG. 3 is a section along the line of FIG. 1.
Figure 5:
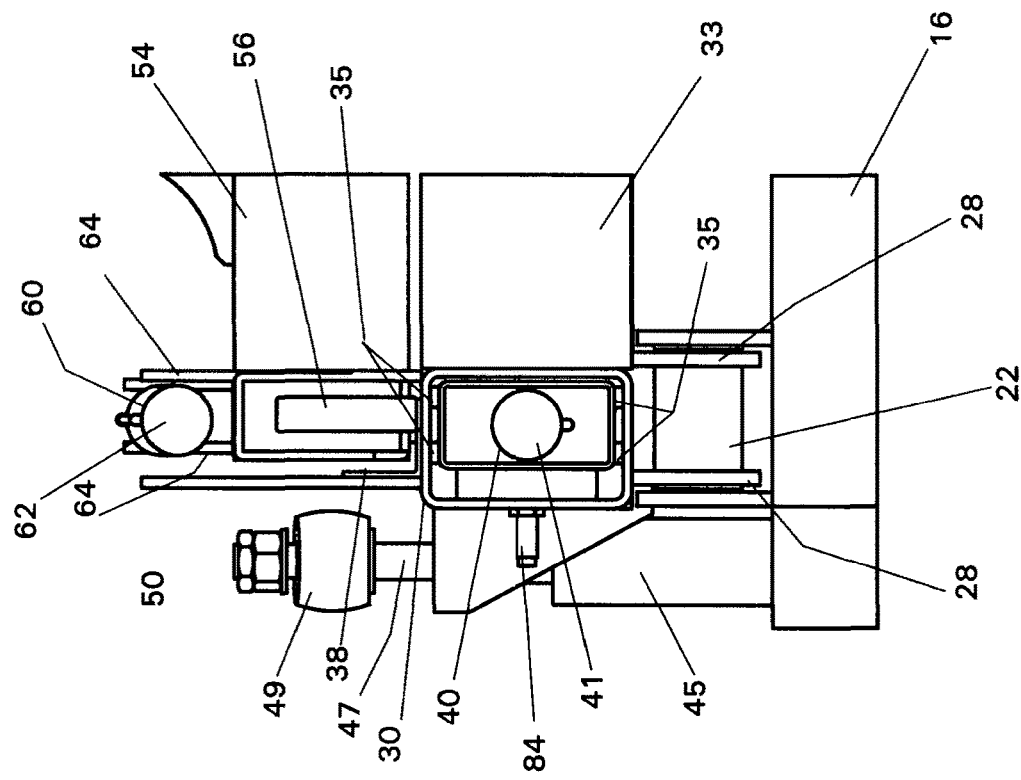
FIG. 5 is an enlarged partial end view in the direction of arrow V, in FIG. 3.
Figure 4:
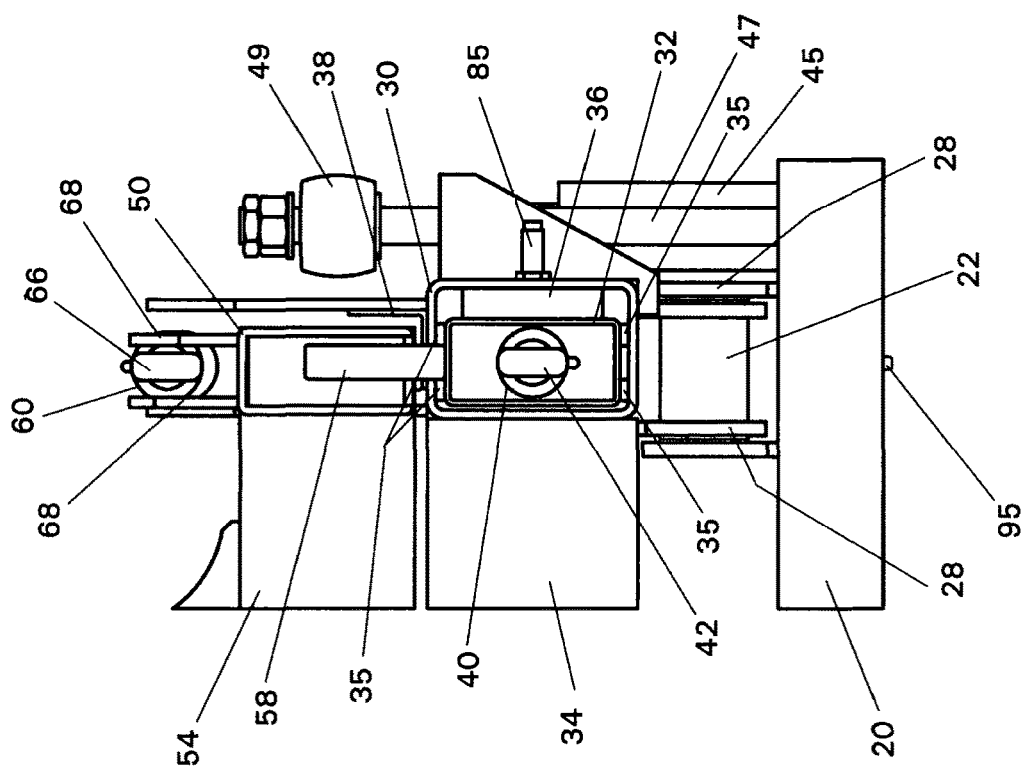
FIG. 4 is an enlarged partial end view in the direction of arrow IV in FIG. 3.
Figure 6:
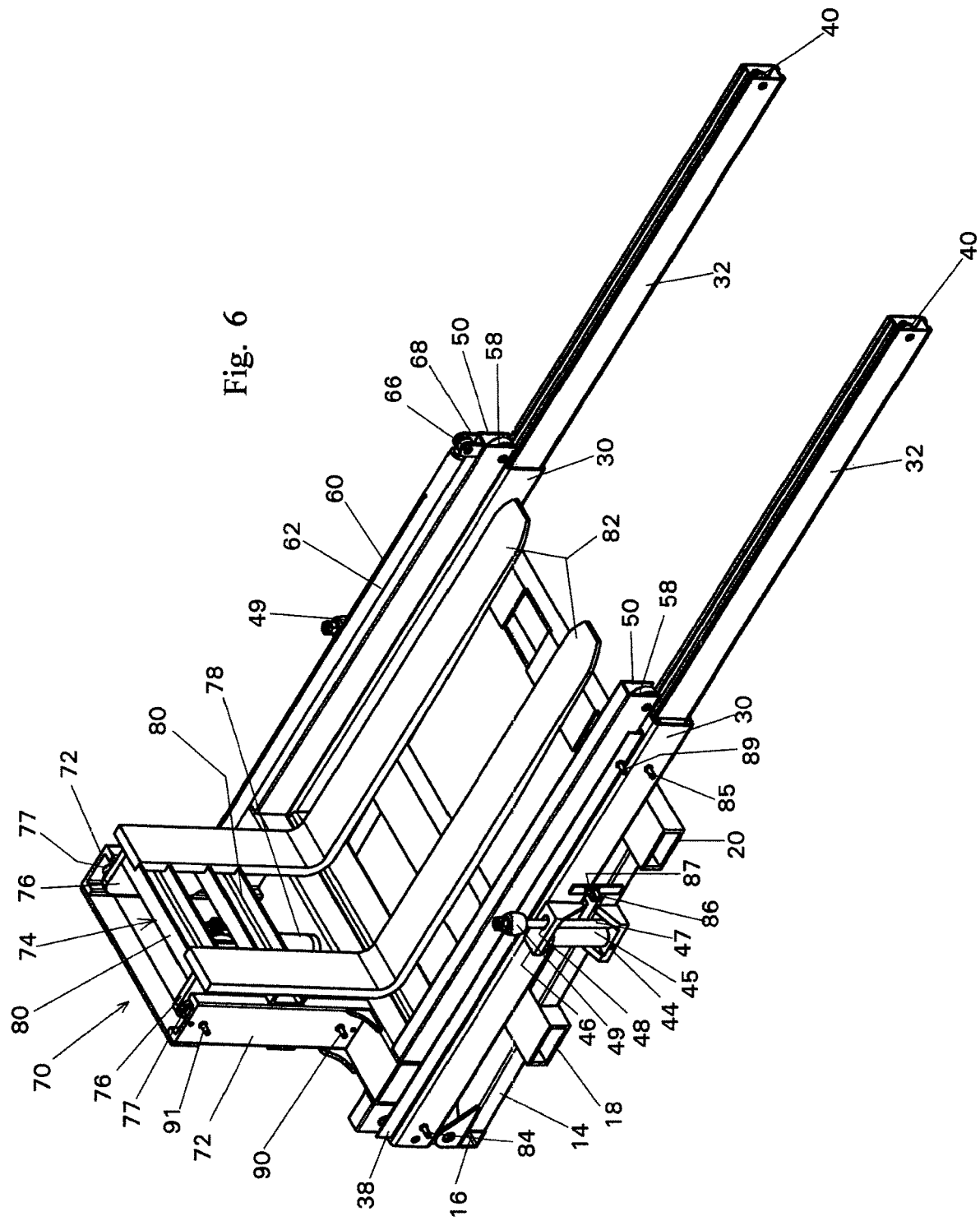
FIG. 6 is an isometric view from the front, side and above, of the mechanism illustrated in FIG. 1 showing the mechanism partially deployed.

To lift a loaded pallet from a racking system, the mechanism 10, in its fully retracted state as illustrated in FIGS. 1 to 3, is raised on the forks of a fork lift truck to a level above that of the beams 142, 144 upon which the target pallet 150 is located, with the telescopic rails 24 located one on each side of the pallet 150 and perpendicular to the front face of the pallet 150.

Lever 130 is then pulled in direction B and the PLC 93 executes the "Lift down" stage of the second sequence.

Figure 7:
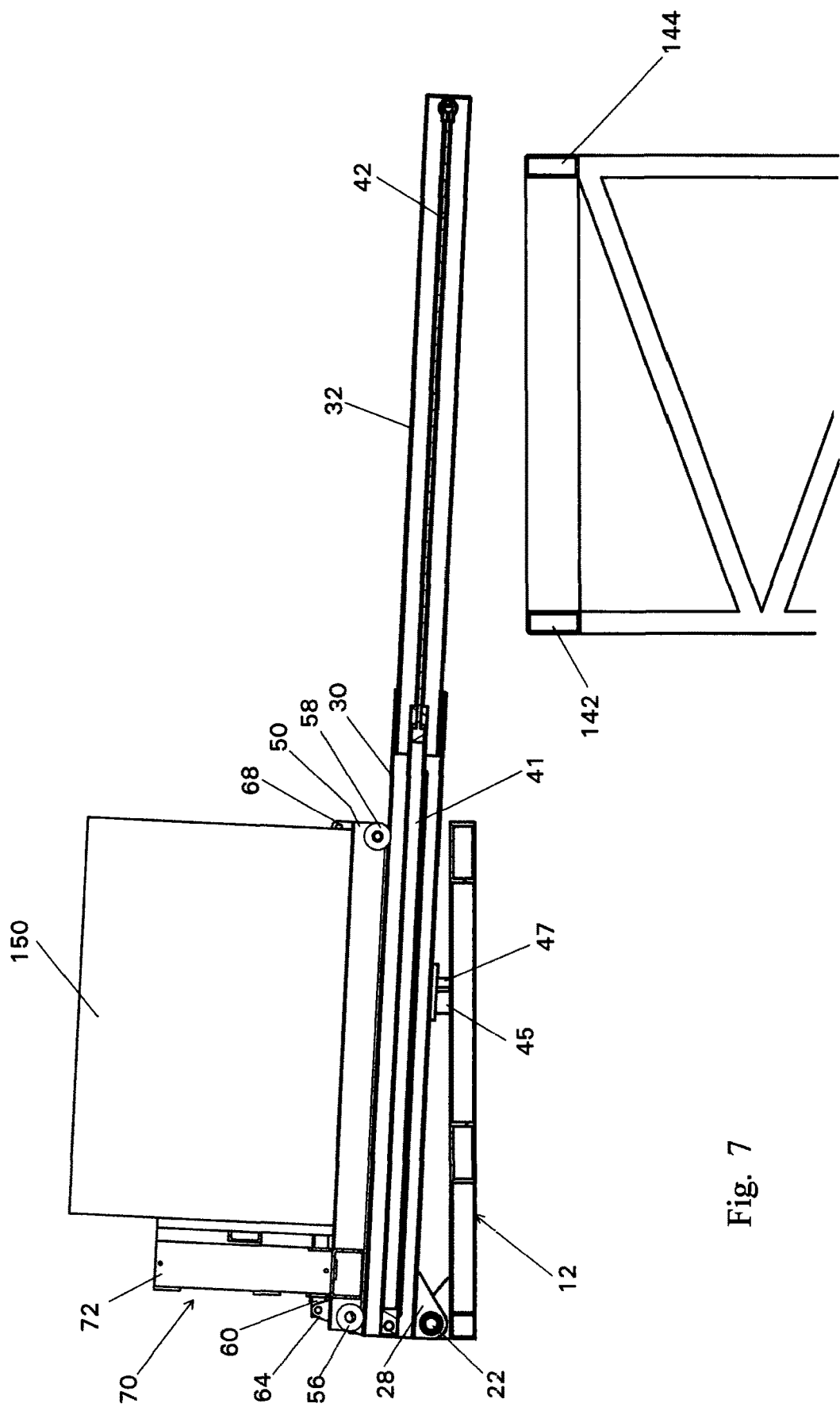
FIG. 7 is a section similar to FIG. 3 with the mechanism deployed is illustrated in FIG. 6.

Lever 130 is then pushed in direction A, so that the PLC 93 executes the "Tilt down" stage of the first sequence until switch 87 indicates that stage complete and the PLC goes onto the "Rail out" stage of the first sequence until the switch means 85 indicates that the rails 24 are fully extended. In this position, as illustrated in FIG. 7, the extended rails which are tilted downwardly, are supported one on either side of the pallet 150, above the front and rear beams 142, 144 of the racking system.

Figure 8:
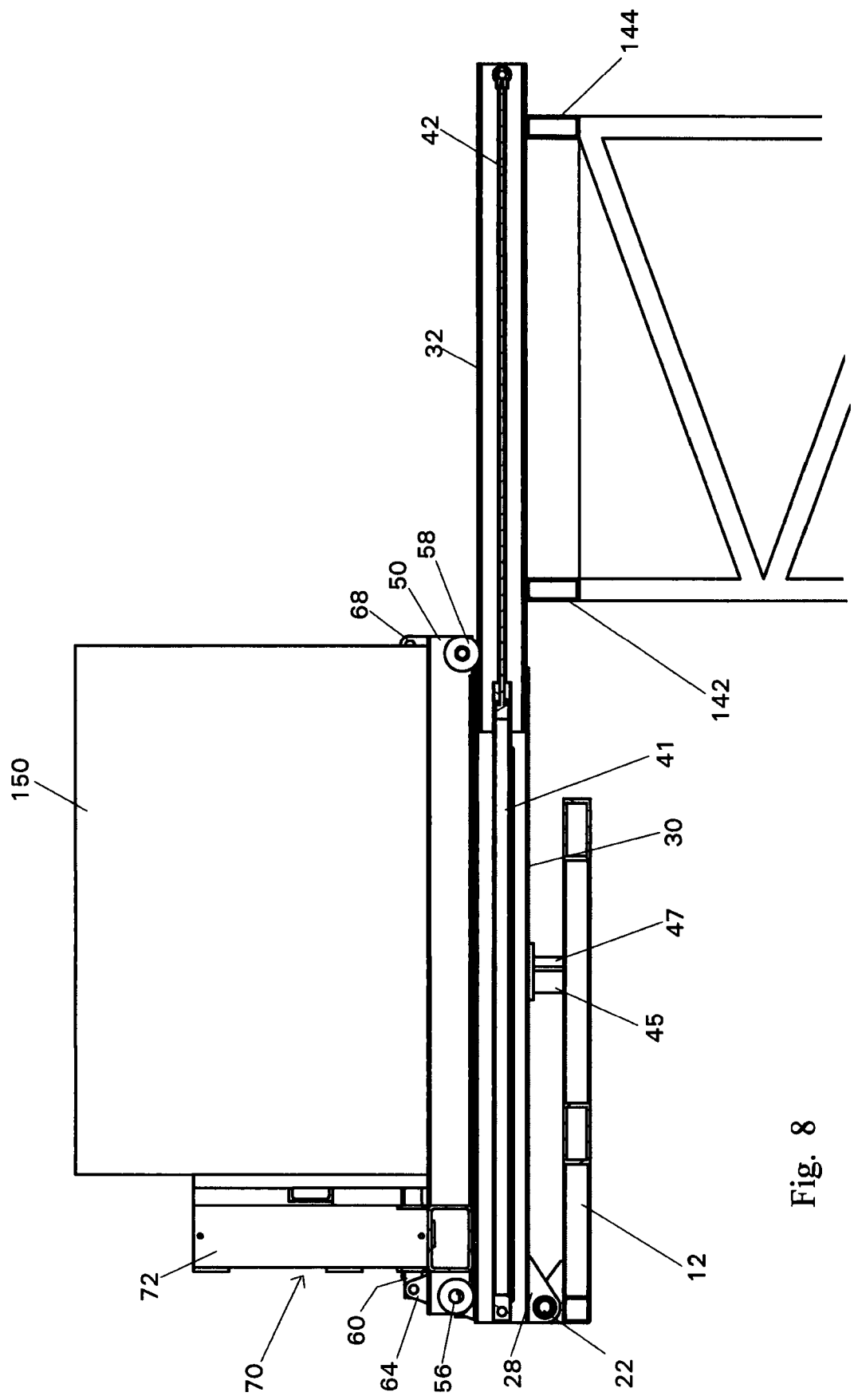
FIG. 8 is a section similar to FIG. 7 showing a further stage of deployment.
Figure 9:
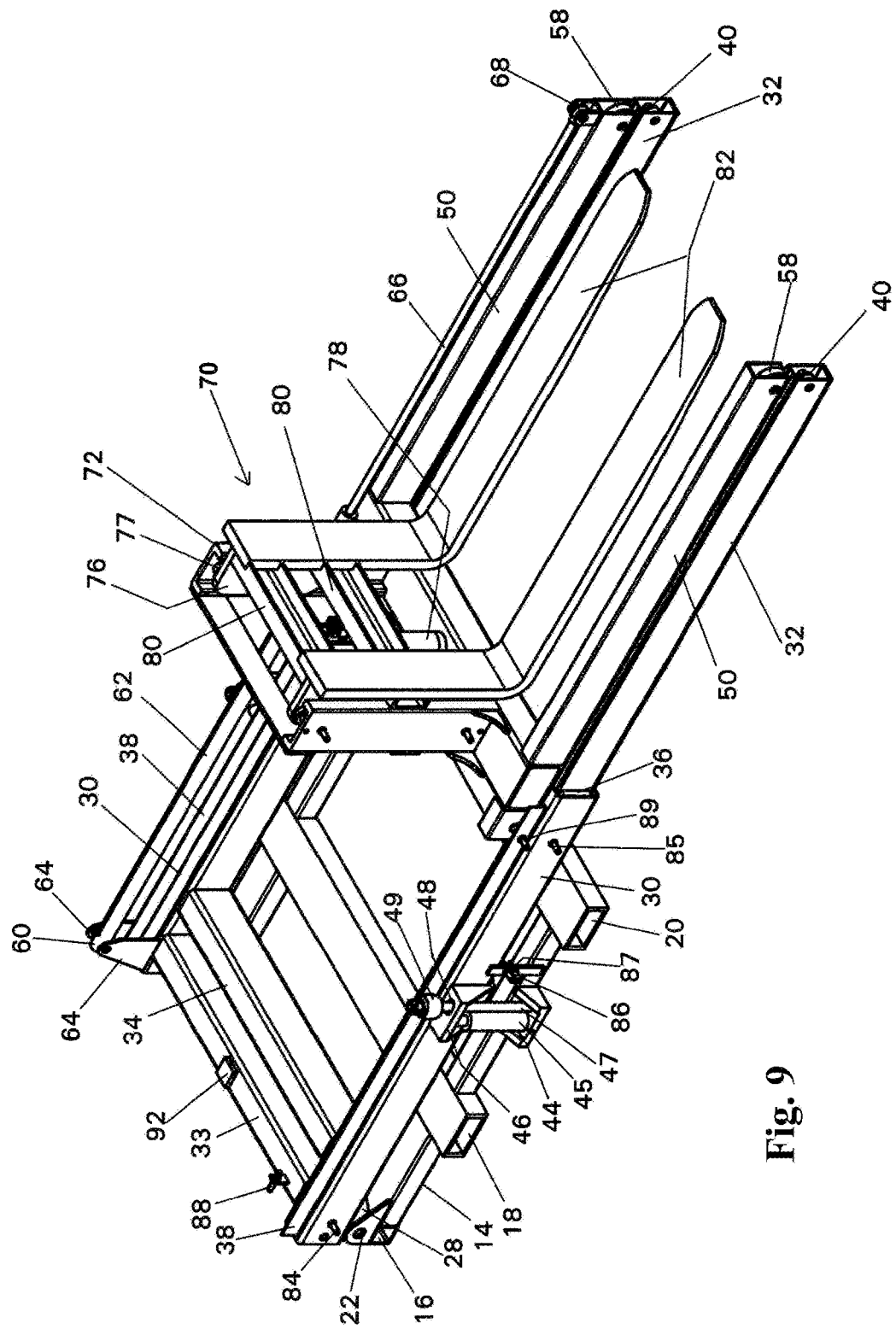
FIG. 9 is an isometric view from the front, side and above, of the mechanism illustrated in FIG. 1, showing the mechanism fully deployed.
Figure 10:
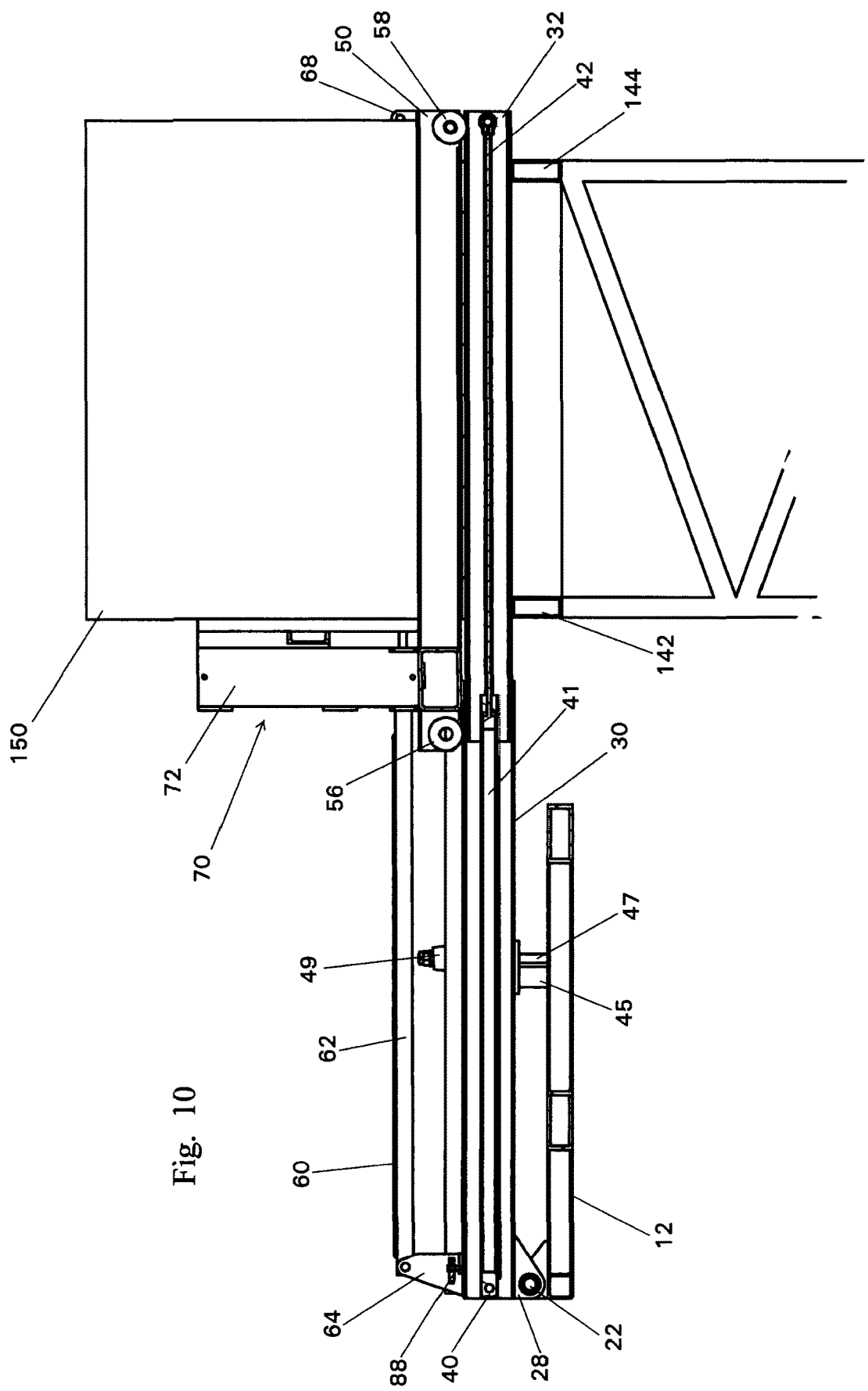
FIG. 10 is a section similar to FIG. 3 with the mechanism deployed is illustrated in FIG. 8.
Figure 11:
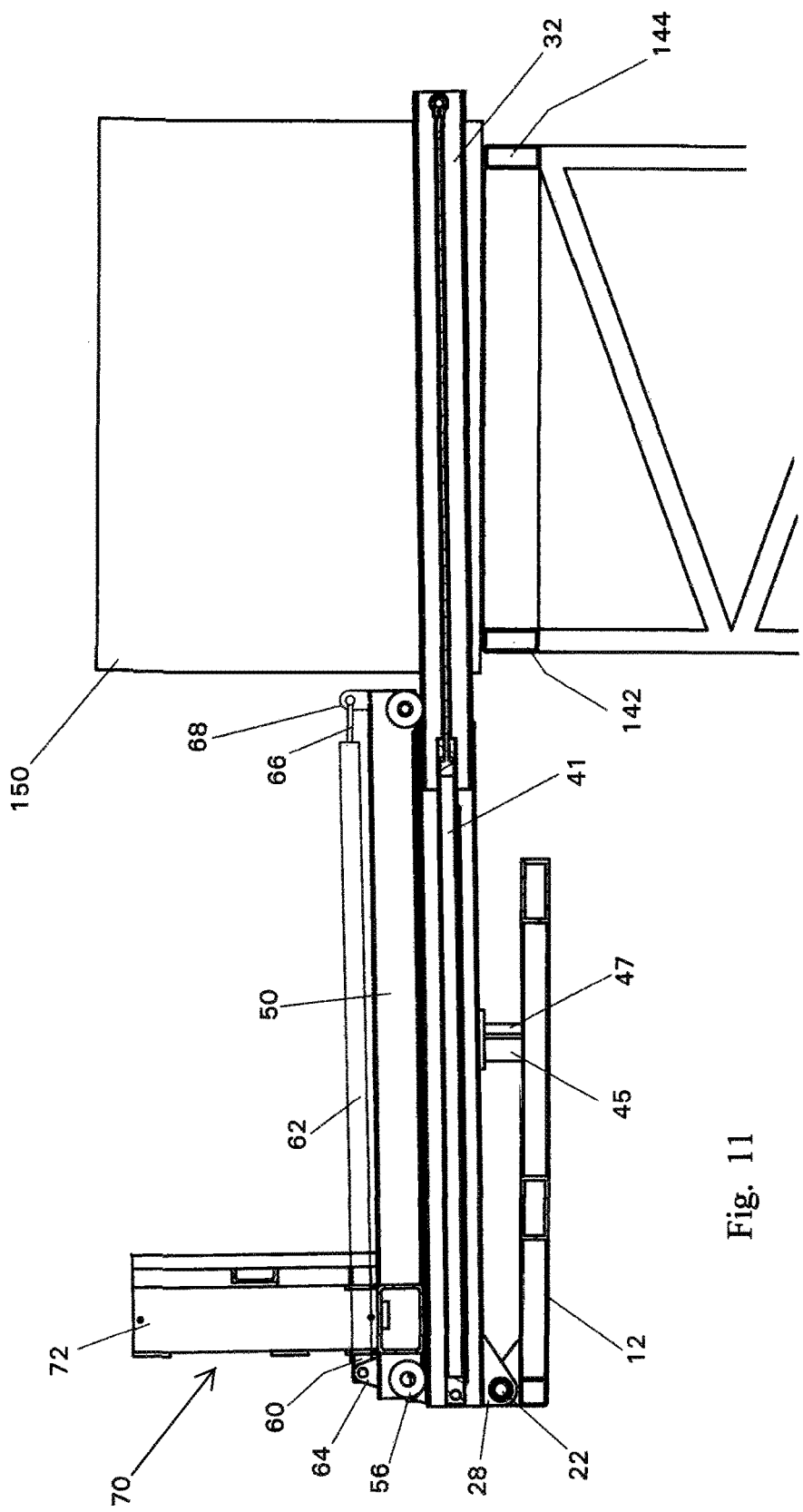
FIG. 11 is a view similar to FIG. 10 showing a further operation.
Figure 12:
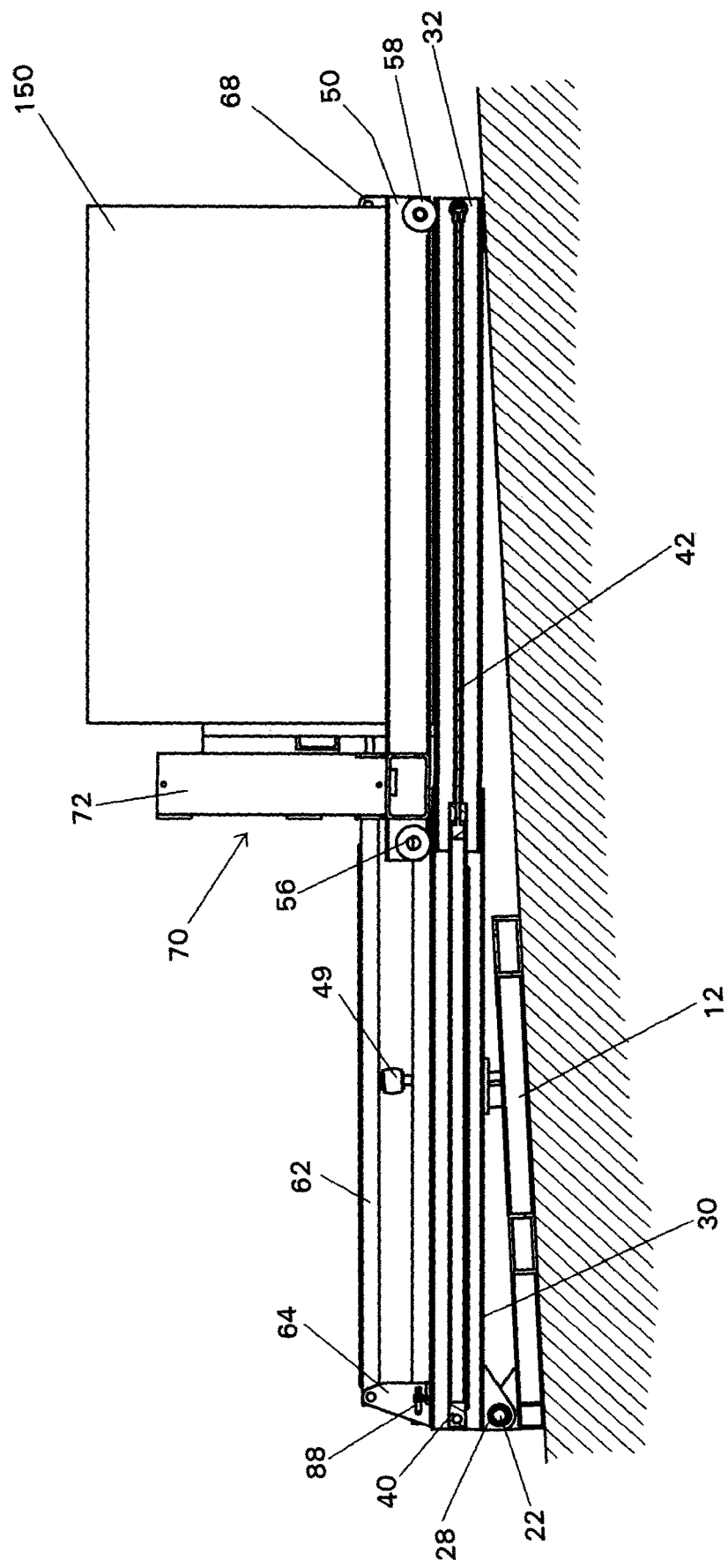
FIG. 12 is a view similar to FIG. 7 showing the mechanism in position to lift a load from or deposit a load on the floor or similar support surface.

The forks of the fork lift truck and the mechanism 10 mounted thereon, are then lowered, until the rails 24 come into engagement with the rear beam 144 of the racking system. Continued lowering of the forks of the lift truck will then tilt the rails 24 upwardly, until the rails 24 also engage the front rail 142, as illustrated in FIG. 8. When the rails 24 are level, operator stops the forks of the fork lift truck and the level sensor 92 produces a signal to inform the PLC 93 that the mechanism is ready to proceed to the next stage of the first sequence.

With lever 130 still pushed forwards in direction A, the PLC 93 then executes the "Carriage out" stage of the first sequence, until the carriage 50 reaches the limit of its movement away from the hinged ends of rails 24 and the upright portions of forks 82 abut against the front face of the pallet 150.

Lever 130 is then pulled back in direction B and the PLC 93 executes the "Lift up" stage of the second sequence, lifting the pallet 150 clear of the beams 142, 144, so that it is supported on the carriage 50 by the rails 24.

When the forks 82 are at the limit of their upward movement lever 130 is pushed forward in direction A and the PLC 93 executes the "Carriage in" stage of the first sequence, until limit switch 88 indicates that the carriage with pallet 150 loaded thereon is at the extreme of its movement towards the hinge end of rails 24.

With lever still pushed forward, the PLC 93 executes the "Tilt up" stage of the first sequence and when limit switch 86 indicates that the rams 45 are at the limit of their extension when the rails 24 will be clear of the beams 142, 144, the PLC 93 will execute the "Rail in" stage of the first sequence. The lever 130 is then returned to its central neutral position in which solenoids 102, 104, 106 and 108 are isolated from the hydraulic power source 126 and drain 128. The pallet 150 mounted on the attachment 10 may then be lowered on the forks of the fork lift truck, by pulling the lift control spool valve lever of the lift truck rearwards.

To deposit a loaded pallet 150 into a racking system, the pallet 150 is mounted onto the mechanism 10, either from the floor or similar support surface, or from another location in the racking system, as described above. The mechanism 10, in its fully retracted state as illustrated in FIGS. 1 to 3, with the pallet 150 mounted on the forks 82 thereof, is raised on the forks of a fork lift truck to a level above that of the target beams 142, 144 upon which the pallet 150 is to be placed, with the telescopic rails 24 located one on each side of the pallet 150 and perpendicular to the beams 142, 144.

Lever 130 is then pulled in direction B and the PLC 93 executes the "Lift up" stage of the second sequence.

Lever 130 is then pushed in direction A, so that the PLC 93 executes the "Tilt down" stage of the first sequence, and then upon receiving the signal from switch means 87 the "Rail out" stage of the first sequence, until the switch means 85 indicates that the rails 24 are fully extended. In this position, as illustrated in FIG. 7, the extended rails which are tilted downwardly, are supported above the front and rear beams 142, 144 of the racking system.

The forks of the fork lift truck and the mechanism 10 mounted thereon, are then lowered, until the rails 24 come into engagement with the rear beam 144 of the racking system. Continued lowering of the forks of the lift truck will then tilt the rails 24 upwardly, until the rails 24 also engage the front rail 142, as illustrated in FIG. 8. When the rails 24 are level, operator stops the forks of the fork lift truck and the level sensor 92 produces a signal to inform the PLC 93 that the mechanism is ready to proceed to the next stage of the first sequence.

Lever 130 is then pushed forwards in direction A and the PLC 93 then executes the "Carriage out" stage of the first sequence, until the carriage 50 reaches the limit of its movement away from the hinged ends of rails 24 and the upright portions of forks 82 abut against the front face of the pallet 150.

Lever 130 is then pulled back in direction B and the PLC 93 executes the "Lift down" stage of the second sequence, lowering the pallet 150 on to the beams 142, 144, and clear of the pallet.

When the forks 82 are at the limit of their downward movement lever 130 is pushed forward in direction A and the PLC 93 executes the "Carriage in" stage of the first sequence, until limit switch 88 indicates that the carriage with pallet 150 loaded thereon is at the extreme of its movement towards the hinge end of rails 24.

With lever still pushed forward, the PLC 93 executes the "Tilt up" stage of the first sequence and when limit switch 86 indicates that the rams 45 are at the limit if their extension when the rails 24 will be clear of the beams 142, 144, the PLC 93 will execute the "Rail in" stage of the first sequence.

The PLC 93 may be programmed with maximum periods for carrying out the various stages of the first and second sequences. If a stage is timed out or the PLC 93 detects some other malfunction of an operation, for example if the level sensor 92 indicates that the mechanism with the rails extended, has been lowered below the appropriate level, so that the rails engage only the front beam 142 of the racking system, it will stop and sound an alarm. If the alarm sounds, or if the operator observes a problem during any stage of the first and second sequence, movement of lever 130 to the central neutral position for a time out period, will reset the PLC 93 and cause it to reverse any incomplete stage of the first and second sequence.

The operation of the mechanism 10 as described above, is with respect to a pallet with top and bottom decks, which requires the rails 24 to lie outside the vertical projection of the pallet. With pallets which do not have a bottom deck, for example a standard European Pallet, where the rails 24 may engage the beams 142, 144 of the racking system below the upper deck of the pallet, the pallet may overlie the rails 24.

Where it is necessary for the telescopic rails and components of the carriage to be located outside the vertical projection of the pallet. This may be achieved by designing the attachment for a specific maximum width of pallet, for example a standard pallet width. Alternatively, the lateral separation of the telescopic rails and width of the carriage may be adjustable.

While the mechanism 10 is particularly suitable for transferring pallets, it may be used with other loads, for example boxes or bins which have raised bases permitting access for the forks 82 of the mechanism 10.

Various modifications may be made without departing from the invention. For example, while in the embodiment described with reference to the drawings the mechanism of the present invention has been described as an attachment 10 is designed to be mounted on the lifting forks of the lift truck, the mechanism may alternatively be designed as an integrated part of the lift truck to replace the forks of the lift mechanism of the lift truck or may form the permanent lifting device of the lift truck. When the mechanism is designed as an integrated part of the lift truck, a dedicated control system may also be integrated with the control systems of the lift truck, providing for example separate control means for the mechanism and other systems of the lift truck.

While the attachment 10 described above may be used for transferring loads to either side of the truck, by engaging the attachment from one side or the other, the telescopic rail assembly may alternatively be mounted to a sub-frame for rotation in a horizontal plane so that the telescopic rails 24 could be rotated to transfer loads to either side or to the front of the lift truck. With this arrangement a load may be transferred from racking on one side of the lift truck to racking on the other side of the lift truck or in front of the lift truck, without lowering the load to the ground.

The invention claimed is:

1. A mechanism for transferring loads comprising:
   a frame adapted to be mounted on a lift mechanism of a lift truck,
   a pair of telescopic rails mounted at one end to the frame, the telescopic rails extending parallel to one another, the telescopic rails being extendable laterally of the lift mechanism of the lift truck, between retracted and extended positions in which the distal ends of the telescopic rails are supported,
   an actuator attached to the frame and cooperating with the pair of telescopic rails to move the telescopic rails between a retracted and an extended position, and
   a carriage mounted on the telescopic rails for movement there along when the telescopic rails are in the extended positions and the free ends of the telescopic rails are supported, the carriage having a secondary lift mechanism mounted thereon by which a load may be raised and lowered relative to the carriage and the rails.

2. The mechanism according to claim 1 wherein the telescopic rails, carriage and secondary lift mechanism are driven hydraulically, pneumatically, electrically and/or mechanically.

3. The mechanism according to claim 1 wherein the telescopic rails, carriage and secondary lift mechanism are driven from a power take off, of the drive systems of the lift truck.

4. The mechanism according to claim 3 wherein the telescopic rails are mounted at one end to the frame about a transverse horizontal axis by hinges; whereby the telescopic rails are free to pivot relative to the frame, between a lowered position in which the telescopic rails are tilted downwardly towards the frame from a hinged end to a free ends; and a raised position in which the telescopic rails are tilted upwardly away from the frame from the hinged ends to the free ends; whereby when the telescopic rails in their tilted down position are extended, the telescopic rails may be first brought into engagement with a support surface adjacent their ends and by lowering the mechanism may be brought into engagement with the support surface at two or more points.

5. The mechanism according to claim 1 wherein a control system is provided for sequencing the various operations of the mechanism.

6. The mechanism according to claim 5 wherein the control system includes interlock to prevent movement of the carriage from its retracted position, until the telescopic rails are in the extended position and are supported at their free ends.

7. The mechanism according to claim 6 wherein the telescopic rails are mounted at one end to the frame about a transverse horizontal axis by hinges; whereby the telescopic rails are free to pivot relative to the frame, between a lowered position in which the telescopic rails are tilted downwardly towards the frame from the hinged end to the free ends; and a raised position in which the telescopic rails are tilted upwardly away from the frame from a hinged end to a free end; whereby when the telescopic rails in their tilted down position are extended, the telescopic rails may be first brought into engagement with a support surface adjacent their ends and by lowering the mechanism may be brought into engagement with the support surface at two or more points.

8. The mechanism according to claim 1 wherein the frame is adapted to be mounted on forks of the lift mechanism of a lift truck, whereby the frame may be mounted on the forks from either side, so that the telescopic rails may be extendable to either side of the lift truck.

9. The mechanism according to claim 8 wherein the telescopic rails are mounted at one end to the frame about a transverse horizontal axis by hinges; whereby the telescopic rails are free to pivot relative to the frame, between a lowered position in which the telescopic rails are tilted downwardly towards the frame from a hinged end to a free end; and a raised position in which the telescopic rails are tilted upwardly away from the frame from the hinged ends to the free ends; whereby when the telescopic rails in their tilted down position are extended, the telescopic rails may be first brought into engagement with a support surface adjacent their ends and by lowering the mechanism may be brought into engagement with the support surface at two or more points.

10. The mechanism according to claim 1 wherein the telescopic rails are mounted to the frame so that they are pivotal about a vertical axis, whereby the telescopic rails may be pivoted to extend to either side of the lift truck.

11. The mechanism according to claim 10 wherein the telescopic rails are mounted at one end to the frame about a transverse horizontal axis by hinges; whereby the telescopic rails are free to pivot relative to the frame, between a lowered position in which the telescopic rails are tilted downwardly towards the frame from a hinged end to a free end; and a raised position in which the telescopic rails are tilted upwardly away from the frame from the hinged ends to the free ends; whereby when the telescopic rails in their tilted down position are extended, the telescopic rails may be first brought into engagement with a support surface adjacent their ends and by lowering the mechanism may be brought into engagement with the support surface at two or more points.

12. The mechanism according to claim 1 wherein the telescopic rails are mounted at one end to the frame about a transverse horizontal axis by hinges; whereby the telescopic rails are free to pivot relative to the frame, between a lowered position in which the telescopic rails are tilted downwardly towards the frame from a hinged end to a free end; and a raised position in which the telescopic rails are tilted upwardly away from the frame from the hinged ends to the free ends; whereby when the telescopic rails in their tilted down position are extended, the telescopic rails may be first brought into engagement with a support surface adjacent their ends and by lowering the mechanism may be brought into engagement with the support surface at two or more points.

13. The mechanism according to claim 12 wherein the telescopic rails can move from their tilted down to their tilted up position, while still allowing free movement of the telescopic rails upwardly from their tilted down position.

14. The mechanism according to claim 12 in which a level switch is operated by movement of the telescopic rails about the hinges, to provide an indication of when the telescopic rails are parallel to the support surface and are fully supported by the support surface.

* * * * *

UNITED STATES PATENT AND TRADEMARK OFFICE
CERTIFICATE OF CORRECTION

PATENT NO. : 10,815,055 B2
APPLICATION NO. : 15/557550
DATED : October 27, 2020
INVENTOR(S) : Paul David Overfield et al.

It is certified that error appears in the above-identified patent and that said Letters Patent is hereby corrected as shown below:

On the Title Page

Delete:
"(71) Applicants: Paul David Overfield, Drakes Broughton (GB); Simon Mark Brown, London Lane Tardebegge (GB)"

And Insert:
--(71) Applicant: Translift Spacemate Limited, Worcestershire (GB)--

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*